(12) United States Patent
Harpin et al.

(10) Patent No.: US 9,404,771 B2
(45) Date of Patent: *Aug. 2, 2016

(54) OPTICAL SENSOR

(71) Applicant: OXSENSIS LIMITED, Oxfordshire (GB)

(72) Inventors: Arnold Peter Roscoe Harpin, Oxford (GB); John Paul Drake, Lambourn (GB); Stephen Geoffrey Tyler, Abingdon (GB)

(73) Assignee: Oxsensis Ltd., Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,106

(22) Filed: Mar. 4, 2014

(65) Prior Publication Data

US 2014/0246610 A1 Sep. 4, 2014

Related U.S. Application Data

(63) Continuation of application No. 12/747,872, filed as application No. PCT/GB2008/004104 on Dec. 12, 2008, now Pat. No. 8,705,045.

(30) Foreign Application Priority Data

Dec. 14, 2007 (GB) .................................. 0724411.4

(51) Int. Cl.
*G01B 9/02* (2006.01)
*G01D 5/353* (2006.01)
*G01K 11/32* (2006.01)
*G01L 9/00* (2006.01)
(Continued)

(52) U.S. Cl.
CPC ........ *G01D 5/35329* (2013.01); *G01K 11/3206* (2013.01); *G01L 9/0079* (2013.01); *G01L 23/16* (2013.01); *G02B 6/4206* (2013.01); *G01K 2205/00* (2013.01)

(58) Field of Classification Search
CPC .......... G01D 5/35329; G01K 11/3206; G01K 2205/00; G01L 23/16; G01L 9/0079; G02B 13/18; G02B 2003/0093; G02B 3/08; G02B 6/32; G02B 6/4206; G02B 7/027
See application file for complete search history.

(56) References Cited

U.S. PATENT DOCUMENTS 3,703,417 A * 11/1972 Rosa et al. .................... 429/139
4,933,545 A    6/1990 Saaski et al.
(Continued)

FOREIGN PATENT DOCUMENTS

EP   0 380 179 A1   8/1990
GB   2175086 A     11/1986
(Continued)

*Primary Examiner* — Michael A Lyons
*Assistant Examiner* — Dominic J Bologna
(74) *Attorney, Agent, or Firm* — Birch, Stewart, Kolasch & Birch, LLP

(57) ABSTRACT

An optical sensor (10) comprises an optical cavity defined by a dielectric body and responsive to one or more physical environmental conditions, and a waveguide (70) having a terminal end spaced apart from the optical cavity such that light is optically coupled from the terminal end of the waveguide (70) to the optical cavity. The waveguide (70) is arranged such that, in use, it is maintained at a first temperature that would not damage the optical coupling to the optical cavity when the dielectric body is maintained at a second temperature sufficient to damage the optical coupling to the optical cavity.

19 Claims, 11 Drawing Sheets

(51) Int. Cl.
*G01L 23/16* (2006.01)
*G02B 6/42* (2006.01)

(56) References Cited

U.S. PATENT DOCUMENTS

| | | | |
|---|---|---|---|
| 5,280,173 A | 1/1994 | Morse et al. | |
| 5,537,504 A * | 7/1996 | Cina et al. | 385/93 |
| 7,782,465 B2 | 8/2010 | Gibler et al. | |
| 8,705,045 B2 * | 4/2014 | Harpin et al. | 356/477 |
| 2003/0019838 A1 | 1/2003 | Shaw et al. | |
| 2003/0165291 A1 | 9/2003 | Bhagavatula et al. | |
| 2004/0114865 A1 * | 6/2004 | Ryall | G02B 6/2937 385/39 |
| 2005/0195402 A1 * | 9/2005 | May et al. | 356/480 |
| 2006/0133715 A1 | 6/2006 | Belleville et al. | |
| 2006/0274323 A1 * | 12/2006 | Gibler et al. | 356/506 |
| 2007/0003207 A1 | 1/2007 | Dunphy et al. | |
| 2007/0013914 A1 | 1/2007 | May et al. | |
| 2007/0089524 A1 * | 4/2007 | Walchli | G01L 9/0079 73/718 |
| 2008/0297808 A1 | 12/2008 | Riza et al. | |

FOREIGN PATENT DOCUMENTS

| | | |
|---|---|---|
| GB | 2202936 A | 10/1988 |
| GB | 2237872 A | 5/1991 |
| GB | 2338059 A | 12/1999 |
| JP | 3-25132 U | 3/1991 |
| JP | 8-29640 A | 2/1996 |
| JP | 2002-349336 A | 12/2002 |
| WO | WO 99/60341 A1 | 11/1999 |
| WO | WO 2005/098385 A1 | 10/2005 |
| WO | WO 2007/019676 A1 | 2/2007 |
| WO | WO 2007/019714 A1 | 2/2007 |

* cited by examiner

Fig. 9A
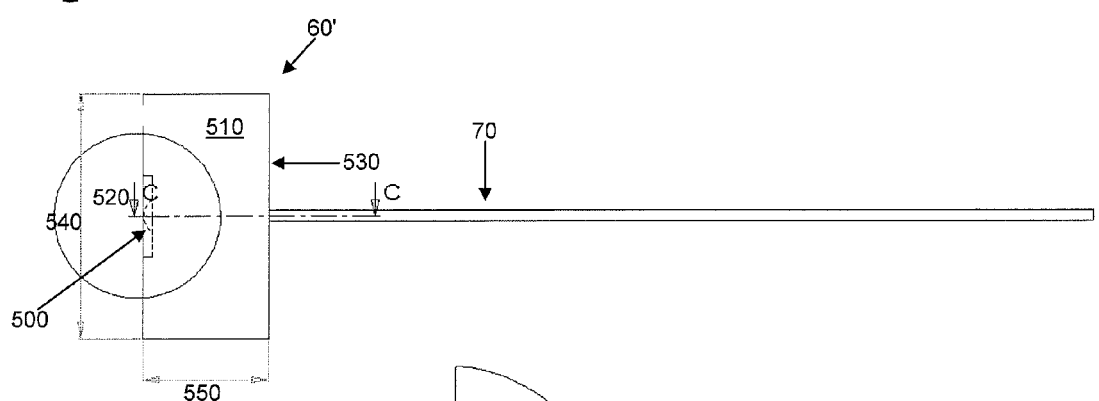
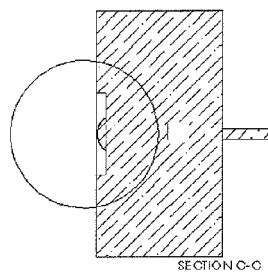
Fig. 9B
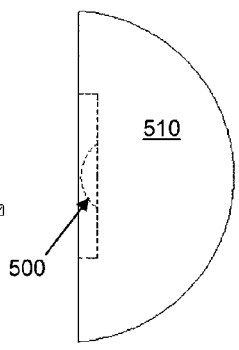
Fig. 9C

OPTICAL SENSOR

This application is a Continuation application of co-pending U.S. application Ser. No. 12/747,872, filed Aug. 3, 2010, which is the U.S. National Phase of PCT/GB2008/004104, filed Dec. 12, 2008. Priority is claimed thereto under 35 U.S.C. §120. This application also claims priority under 35 U.S.C. §119(a) to Great Britain application No. 0724411.4, filed in the United Kingdom on Dec. 14, 2007. The entire contents of all the above-mentioned priority applications are hereby incorporated by reference.

FIELD OF THE INVENTION

The present invention relates to an optical sensor and more specifically to an optical sensor for measuring pressure and/or temperature.

BACKGROUND OF THE INVENTION

WO 99/60341 describes an optical sensor, fabricated using conventional micromachining techniques, for measuring changes in temperature and pressure inside a combustion engine. The sensor comprises a slab of silicon having a recess defined in one surface by etching. A micro-capillary, having a silica fibre fixed inside, is adhered to the silicon slab so as to close the recess. The face of the silica fibre and the inner surface of the recess directly opposite the fibre serve to define a Fabry-Perot cavity. Light incident along the silica fibre is reflected within the Fabry-Perot cavity and guided back along the silica fibre. The reflected light creates interference fringes whose characteristics are determined by the length of the Fabry-Perot cavity. Changes in the external pressure cause the wall of the silicon slab directly opposite the fibre to deflect, causing a change in the length of the Fabry-Perot cavity. This in turn creates a change in the characteristics of the interference fringes thus registering a change in pressure. The sensor may also be used to sense changes in temperature by employing a suitably thick slab of silicon. Changes in temperature cause the slab to expand or contract, which in turn results in a similar expansion or contraction of the Fabry-Perot cavity.

Whilst the silicon sensor may be used for many applications, the sensor is unsuitable for environments that are at elevated temperatures. In particular, the maximum temperature at which the silicon sensor can operate is around 450° C. Above this temperature, the elastic properties of silicon become unstable making any measurements unreliable.

WO 2005/098385 describes a sapphire optical sensor sensitive to both pressure and temperature. A waveguide formed from an optical fibre, hollow ceramic rod or metal tube is used to interrogate the optical sensor. The waveguide is bonded directly to the optical sensor using one of a number of bonding techniques. In one embodiment a sapphire optical fibre is fusion bonded to the optical sensor at temperatures between 600° C. and 1500° C.

In an alternative embodiment described in WO 2005/098385, the waveguide is spaced from the optical sensor by a short distance of around 3-100 μm. However, this sensor is not suitable for use at elevated temperatures as the fusion bond between the waveguide and the optical sensor will weaken and may fail between 600° C. and 1500° C.

US 2007/0013914 describes an optical fibre sensor formed by bonding a sapphire membrane to the end of a capillary tube and bonding an optical fibre within the capillary tube so that the end of the optical fibre and the near (to the optical fibre) surface of the sapphire membrane define a first optical cavity. The optical fibre may be bonded with epoxy or laser welded to the capillary tube.

A second optical cavity is defined by the near and far surfaces of the sapphire membrane and is used to obtain a compensating temperature measurement. However, due to thermal mismatch between the optical fibre and capillary tube this sensor is not suitable for use at high temperatures.

These prior art devices are not suitable for use at elevated temperatures or to be cycled repeatedly from low to high temperatures without structural damage due to thermal mismatch. Therefore, there is required an optical sensor that overcomes these problems.

SUMMARY OF THE INVENTION

According to a first aspect of the present invention there is provided an optical sensor comprising an optical cavity defined by a dielectric body. The optical cavity is responsive to one or more physical environmental conditions such as for instance, temperature and pressure. A waveguide having a terminal end is separated from the optical cavity and arranged so that light is coupled from the waveguide to the optical cavity. In use the waveguide is maintained at a lower temperature than that of the dielectric body so that the optical cavity may be responsive to environments at higher temperatures than would otherwise damage the waveguide.

Preferably, the optical cavity may be a Fabry-Perot cavity interrogated by a broadband source of radiation emitted and collected by the waveguide.

According to a second aspect of the present invention the optical sensor further comprises a temperature reduction means for maintaining the waveguide proximal to the terminal end at or below the first temperature. In other words, the temperature reduction means allows the optical sensor to operate in environments at temperatures that would otherwise damage the optical coupling between the waveguide and optical cavity. This damage may for instance, soften or melt the waveguide or other optical components or mechanical joints. This allows the waveguide to be kept close enough to the optical cavity such that misalignment of a beam emitted from the waveguide on to the optical cavity is reduced. This allows the optical sensor to measure environments at higher temperatures or higher temperature cycling than would otherwise damage the waveguide or optical coupling.

Preferably, the temperature reduction means may be arranged to draw heat away from the waveguide.

Preferably, the optical sensor may further comprise a housing having a proximal end and a distal end and arranged to support the dielectric body at the proximal end and support the waveguide at the distal end.

Optionally, the temperature reduction means may comprise a tube surrounding the waveguide. When placed in a temperature gradient through for instance, an engine casing, the distal end may be cooler than the proximal end and any excess heat is drawn away from the waveguide by the temperature reduction means. The tube may have any suitable cross section including circular and may fit loosely or snugly around the waveguide.

Preferably, the temperature reduction means may be formed of metal, such as for instance copper or another suitable heat conductive metal.

In accordance with a third aspect of the present invention the terminal end of the waveguide is far enough from the optical cavity so that the waveguide is maintained at a temperature that does not damage it in use with the sensor operating a temperature at the dielectric body end that would damage the optical coupling. When placed across a temperature gradient the optical cavity may be placed at the hotter end and the terminal end of the waveguide may be located towards the cooler end of the sensor in use.

Preferably, the distance is greater than 1 mm. More preferably the distance is greater than 10 mm. More preferably the distance is equal to or greater than 25 mm.

Advantageously, the optical sensor may further comprise an optical alignment mechanism for providing alignment between the waveguide and the optical cavity. This allows the waveguide to be separated further from the optical cavity (at the hotter end of the sensor) and still maintain sufficient alignment of a beam emitted from the waveguide and incident on the optical cavity.

Advantageously, the alignment mechanism may comprise a ball joint having a ball arranged to support the waveguide and a socket arranged to adjustably support the ball.

Preferably, the ball joint may be arranged within a housing. With a beam emitted and collected by the waveguide the ball joint may be manipulated to maximise the received signal. At a maximised position the ball may then be fixed in position.

Preferably, the ball may be fixed in position relative to the socket by a fixture of for example, a weld.

Optionally, the waveguide and optical cavity may be aligned by mounting the waveguide off axis within a mount. The waveguide may be rotated until the signal is maximised and fixed in position when a maximum signal is achieved.

Advantageously, the optical sensor may further comprise a collimator for collimating the light emitted from the waveguide. This increases the usable amount of light emitted from the waveguide and further allows an increase in distance between the optical sensor and the waveguide. A collimated beam allows the separation between waveguide and optical cavity to be greater than 0.5 mm. Without a collimator at greater separations alignment becomes very difficult.

Preferably, the collimator may comprise a lens attached to the terminal end of the waveguide by an attachment. Attaching a lens to the end of the waveguide allows the alignment mechanism to align the lens and waveguide simultaneously.

Optionally, the attachment may be a fusion bond between the waveguide and the lens. Fusing the waveguide to the lens provides a stronger attachment and allows the fibre to be physically supported at a single point within the optical sensor, i.e. the fusion bond between the terminal end of the waveguide and the lens. Fusion bonding also provides greater thermal resilience and may reduce optical losses at the interface between waveguide and lens.

Optionally, the lens may comprise a first surface including a curved portion surrounded by a planar portion.

Advantageously, the lens may further comprise a planar second surface parallel with the planar portion of the first surface.

Optionally, the curved portion or portions may be formed by micro-machining. The lens may also take the form of a fresnel lens or diffractive lens. These or other lens forms may be made by etching.

Optionally, the lens may be formed from sapphire or silica. Bonding between a silica lens and a silica fibre (where used) is therefore simplified and more straightforward.

Optionally, the optical sensor may further comprise a spacer extending from the dielectric body towards the terminal end of the waveguide and surround the light emitted from the waveguide. The dielectric body may be bonded to the spacer, which may be a hollow tube or a solid rod transparent to the beam emitted from the waveguide. A hollow tube may reduce heat conduction from the hotter end of the optical sensor to the cooler end. A solid rod may reduce complexity of the optical sensor and reduce residual stresses. The bonding technique used may preferably withstand the high temperatures encountered. Suitable bonding techniques included for instance, thermocompression bonding, eutectic flux bonding using materials such as Yttria (see U.S. Pat. No. 6,012,303), laser welding or laser assisted bonding. A thermal compression seal may reduce stresses on the spacer during temperature cycling of the optical sensor.

Preferably, any stresses in the spacer may be removed before and after bonding.

Optionally, the spacer may be sapphire, silica, magnesium oxide, MgAlO, alumina, zirconia or other similar materials. Preferably, the spacer and dielectric body may have very similar coefficients of thermal expansion (CTE) to reduce additional stresses placed on each component when the sensor is heated in use. Therefore, it is advantageous to form the spacer and dielectric body out of the same material, e.g. sapphire-sapphire or MgO—MgO, for instance. The spacer may be made from a polycrystalline phase material (e.g. alumina) but should have a similar CTE to that of the material used for the dielectric body.

Preferably, the spacer may be bonded to a mount. The mount may be integral with a housing.

Advantageously, the mount may be kovar or similar alloy capable of use at high temperatures without significant thermally induced changes.

Optionally, the spacer may be bonded to the mount by oxide bonding. Oxide bonding may provide, a hermetic seal.

Preferably, a thermal compression seal may be arranged to separate the spacer from a mount at an end of the spacer distal from the dielectric body.

Advantageously, the thermal compression seal may be a low-creep washer such for instance, copper or platinum. Advantageously, the washer may be formed from an oxidation resistant ductile material or metal such as platinum or gold, for instance.

Preferably, the washer may be grain-stabilised to further reduce creep. Such washers may apply sufficient compression over a wide temperature range and be able to absorb stresses due to thermal mismatch, which may otherwise shatter the spacer. In this way the spacer may be held using a low modulus material in compression over a large temperature range and cycle.

Preferably, where a sapphire spacer is used, the axis along the sapphire spacer may be collinear with the sapphire C-axis, i.e. its axis of zero birefringence. An advantage of the use of the C-axis is that the optic axis of sapphire coincides with the C-axis so the effect of birefringence is reduced. Consideration of crystal lattice orientation improves thermal matching. Therefore, it is preferable that the axis of the sapphire spacer matches that of the sensor pill. Other orientations may be possible from a mechanical point of view so long as birefringence is considered.

Advantageously, the spacer may be thermally and/or mechanically isolated from the housing. This may reduce vibration that could interfere with the varying pressure signal (sound).

Optionally, the spacer may further comprise a spacing protrusion arranged to separate the spacer from the housing. This allows a structure to be formed that has a simplified or single mode of vibration due to a single point of contact. Preferably, this mode may be chosen or designed to be away from any particular frequencies of interest for the device (e.g. typical frequencies generated by an engine being monitored). The natural or resonant frequency of this vibration mode may then be damped without affecting the desired sensitivity of the device over a particular frequency range.

Optionally, the spacing protrusion may be an annular protrusion.

Preferably, the spacing protrusion may be integral with the spacer.

Advantageously, the spacing protrusion may be separated from the proximal end of the housing. This may further reduce heat conduction to the fibre or lens arrangement.

Advantageously, the waveguide is maintainable below about 700° C. and the dielectric body may be maintainable above about 1000° C. Suitable applications for this optical sensor include sampling pressure and/or temperature within a gas turbine or jet engine.

Preferably, the optical cavity in the dielectric body may define at one end a membrane deflectable in response to changes in external pressure. Absolute and instantaneous pressure may be monitored by the optical sensor.

Optionally, the membrane may be concave in the direction facing the terminal end of the waveguide. In this configuration the optical sensor may be less sensitive to misalignment of the beam emitted from the waveguide.

Optionally, the dielectric body may further comprise one or more pressure equalising channels communicating between the interior and exterior of the optical cavity. This reduces the pressure difference across the membrane allowing a thinner and more deflectable membrane. Such a sensor may also be more sensitive to small changes in pressure waves such as sound waves.

Preferably, the waveguide may be a single mode waveguide and the dielectric body may be sapphire or magnesium oxide. As mentioned above, the material of the dielectric body should match the CTE of the spacer.

Preferably, the waveguide is formed from sapphire or silica. Similar transparent high temperature ceramics may also be used.

According to a third aspect of the present invention there is provided a gas turbine engine comprising an engine casing having an inner surface, the inner surface enclosing a hot gas space having an elevated internal operating temperature, and an optical sensor disposed through an aperture in the inner surface. The optical sensor comprises an optical cavity defined by a dielectric body and responsive to one or more physical environmental conditions such as for instance, temperature and pressure, and a waveguide with a terminal end optically coupled to the optical cavity, wherein the dielectric body is exposed to the hot gas space. The dielectric body may communicate with the hot gas space by for instance, extending through the inner surface in the engine casing into the hot gas space. Hot gases from within the engine may alternatively be directed to the dielectric body, which may be place flush with the inner surface or placed within the engine casing.

The optical sensor may also be used within other types of engines such as, for instance within the combustion chamber of internal combustion engines.

Preferably, the optical sensor may be arranged such that the waveguide is maintained, in use, at a lower temperature than the elevated internal operating temperature by temperature reduction means. The internal operating temperature exposed to the dielectric body would damage the waveguide or optical coupling between the waveguide and optical cavity. However, the temperature reduction means maintains the waveguide at a lower temperature to avoid this damage, whilst at the same time the dielectric body (which can withstand such elevated temperatures) is in contact with the hot gas space.

Advantageously, the temperature reduction means may be arranged to draw heat away from the waveguide.

The optical sensor of the gas turbine engine according to the third aspect of the present invention may comprise any or all of the features of the optical sensor described above with regards to the other aspects of the present invention.

Optionally, a central portion of the membrane may be thickened to reduce optical distortion of reflected light from this thickened central portion. This reduces fringe fading as light may be reflected from a relatively flatter surface.

Preferably, the waveguide may be an optical fibre.

Optionally, the optical fibre may attach to a planar waveguide at its terminal end. The planar waveguide may then shine light onto the optical cavity.

Optionally, the collimator described above may be in the form of a taper or similar structure on the waveguide, the planar waveguide or the optical fibre described above.

BRIEF DESCRIPTION OF THE FIGURES

The present invention may be put into practice in a number of ways and an embodiment will now be described by way of example only and with reference to the accompanying drawings, in which:

FIG. 9A shows a cross-sectional view of a lens and optic fibre arrangement used within a fifth embodiment of the present invention with hidden features shown in dotted lines;

FIG. 9B shows a cross-sectional view along line C-C of FIG. 9A of the lens and optic fibre arrangement of FIG. 9A;

FIG. 9C shows a partial cross-sectional view of the lens of FIGS. 9A and 9B;

FIG. 14 *b* shows a side view of the optical sensor of FIG. 14 *a*;

FIG. 14 *c* shows a cross-sectional view the optical sensor of FIG. 14 *a*; and

FIG. 14 *d* shows a perspective view the optical sensor of FIG. 14 *a*.

It should be noted that the figures are illustrated for simplicity and are not necessarily drawn to scale.

DETAILED DESCRIPTION OF THE PREFERRED EMBODIMENTS

Figure 1:
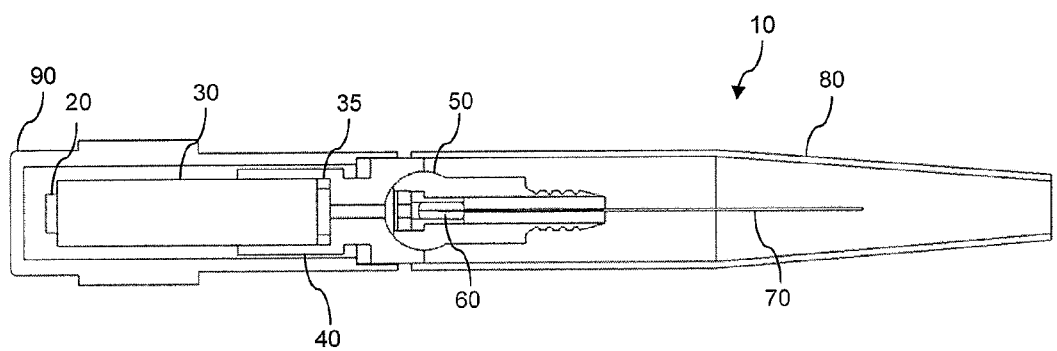
FIG. 1 shows a cross-sectional view of an optical sensor including the temperature and pressure sensing optical cavities, according to a first embodiment of the present invention, given by way of example only.

FIG. 1 shows a cross-sectional view of an optical sensor according to a first embodiment of the present invention. In use, a waveguide delivers a beam of light to a sensor element 20 formed from a dielectric material and defining an optical cavity in the form of a Fabry-Perot cavity. In the preferred embodiment the waveguide is an optical fibre 70 but any suitable waveguide may be used. The sensor element 20 may define one or more optical cavities that may cause interference to occur in beams reflecting off various surfaces within the sensor element 20. The reflected beams are collected by the same optical fibre 70 used to illuminate the sensor element 20 and these reflected beams are interrogated by an interferometer (not shown in this Figure).

Pressure and/or temperature changes alter the physical configuration of the sensor element 20 leading to changes in the interference pattern generated and detected and these changes in interference patterns are decoded to indicate the pressure and temperature at the sensor element site. The face of the sensor element 20 facing away from the fibre 70 is formed from a membrane that is deflectable by changes in pressure. Once the membrane is deflected the dimensions, of the optical cavity within sensor element 20 change leading to a change in the resultant interference pattern. A thicker layer of the material forming the sensor element 20 faces the optical fibre 70 and thermal expansion of this thicker layer results in a change in a further optical cavity dimension and again this leads to a change in the interference pattern which is decoded by the detection interferometer (not shown in this Figure).

The sensor element 20 is made from sapphire and bonded to a sapphire spacer 30, which may be a solid rod or a hollow tube. As the sensor element 20 sits at the hotter end of the optical sensor 10 in use this bond is preferably strong and may be formed by thermocompression, laser welding or laser assisted bonding or any other suitable bonding technique. Preferably this seal is hermetic to reduce the risk of hot gasses at the sensing end of the optical sensor from penetrating the device.

A cap 90 may be placed over the sensor element 20 to protect it or to protect the interior of the tested environment, such as a gas turbine engine or jet engine, for instance. In an alternative embodiment gauze may be placed over the cap to increase protection from foreign bodies.

A mount 40 supports the spacer and may be bonded to the spacer by an oxide seal. To prevent damaging stresses from occurring a compression washer 35 separates the end of the spacer facing the optical fibre 70 from the mount 40. Preferably the compression washer is formed from a material to minimise creep, such as copper or platinum and grain stabilised to further reduce creep when thermal cycling occurs. The cap 90 may be welded to the mount 40.

An outer sleeve 80 protects the optical sensor and provides strain relief at the emerging end of the optical fibre 70. The end of the optical fibre facing the sensor element 20 incorporates a collimator. The collimator may be a lens 60 fusion welded to the terminal end of the optical fibre 70. The lens is secured by a collet and the collet is secured within a ball 50 within a socket defined in a mount 40. In this way the optical fibre 70 may be secured at a single point, i.e. the fusion weld to the lens 60, which may be the only place that may stress the optical fibre 70. The ball and socket arrangement allows alignment of the fibre 70 and lens 60 arrangement to be undertaken during an alignment procedure. The lens 60 and optical fibre 70 arrangement may be aligned to the sensor element 20 by illuminating the sensor element 20 and monitoring the output until the signal is maximised indicating that the optical fibre 70 and sensor element 20 are aligned. Once alignment is achieved the ball 50 may be fixed relative to the mount 40 by a suitable permanent technique such as e-beam or laser welding through dedicated ports in the mount 40, for instance. Alignment of the beam emitted from the fibre 70 to the sensor element 20 within 0.1° is desirable.

Alternatively, the optical fibre may be located off axis and aligned by rotating the optical fibre 70 until the signal is maximised.

A shield (not shown in this Figure) protects the free end of the optical fibre (70).

The sensor element 20 may be preferably manufactured from a refractory material such as, sapphire or magnesium oxide. These materials are transparent in the visible and infrared wavelength ranges, typically at least around 1300 nm and 1550 nm but other wavelengths and wavelength ranges are suitable. The sensor element 20 may be produced by bonding slices of material together. The cavity may be defined by an etching technique such as dry etching or chemical etching. A slice may be thinned to allow a significant pressure response forming a pressure sensitive membrane. The optical fibre 70 may be a single mode fibre.

As described above, a single or multiple optical cavities may be formed in the sensor element 20. If a single (pressure only sensing) optical cavity is required, then the surfaces of the optical sensor 20 not forming the cavity may be wedged to frustrate any further cavities. This provides a simplified device as only one optical cavity needs to be interrogated. A suitable wedge angle for the front surface of the sensor element 20 may be 5°, for instance. Such wedging also avoids coupling of unwanted reflections where contaminants such as soot deposits, for instance, change the reflectivity of exposed optical surfaces.

Figure 2:
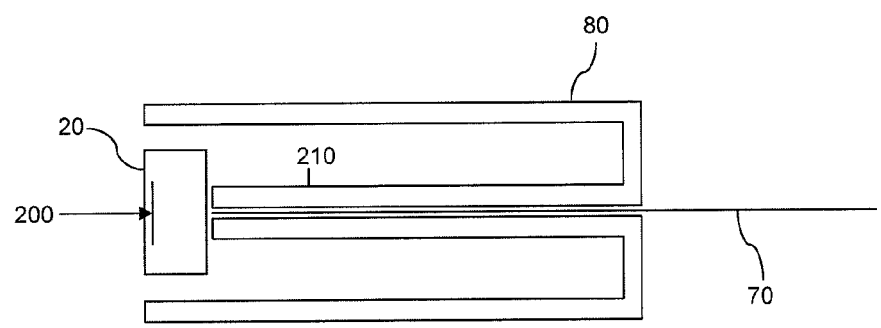
FIG. 2 shows a schematic cross-sectional view of an optical sensor according to a second embodiment of the present invention, given by way of example only.

FIG. 2 shows a schematic diagram of a second embodiment of the present invention. This is a simplified diagram and not all components are shown. In this embodiment the optical fibre 70 is held close to the optical sensor 20 towards the hotter end of the outer sleeve 80. In this alternative configuration, the alignment tolerance between the beam emitted from the optical fibre 70 and the optical cavity 200 is reduced as they are spatially nearer to each other. The minimum separation depends on thermal considerations, i.e. how hot the optical sensor 20 is in use and how efficiently the optical fibre 70 may be cooled. Evacuating the interior of the device further reduces heat transfer to the optical fibre 70. For instance, this configuration may allow the optical fibre 70 and optical sensor 20 to be less than or equal to about 0.5 mm apart therefore allowing satisfactory coupling without requiring a collimator or lens. Furthermore, this embodiment does not require such a sophisticated alignment mechanism. Instead, the optical fibre 70 is held within a supporting tube 210, which acts as a heat sink to draw heat away from the optical fibre and to keep the optical fibre 70 within its optimal temperature range. The heat sink tube 210 is attached to the cooler end of the outer sleeve 80. In this embodiment no collimating lens is required. Nevertheless, a small separation between the optical element 20 and the terminal end of the optical fibre 70 reduces thermal contact between those components.

Not shown in FIG. 2 is sleeving used to protect and stress relieve the optical fibre 70 as it exits the back of the outer sleeve 80. The method of sleeving may be conventional but the material may preferably be capable of withstanding 700° C. It will be appreciated that in one example embodiment of the present invention the sensor design may be tailored to fit in a hole in the side of a gas turbine of internal combustion engine, so that the sensor may be flush with the inner wall of the engine and is therefore capable of measuring for example pressure. The back end (with the optical fibre 70 exiting the optical sensor) may be flush with the outer wall of the engine and so the temperature gradient along the package may largely be dictated by the heat flux in the engine wall, and the outer engine temperature may dictate the back end temperature of the optical sensor.

In an alternative configuration the optical sensor may be held at its rear end (optical fibre 70 end) so the optical sensor may reach into a hot environment (say protruding into the combustion area of an engine). In this configuration the package may have thinner walls/longer length to allow for lower back end temperatures.

Figure 3:
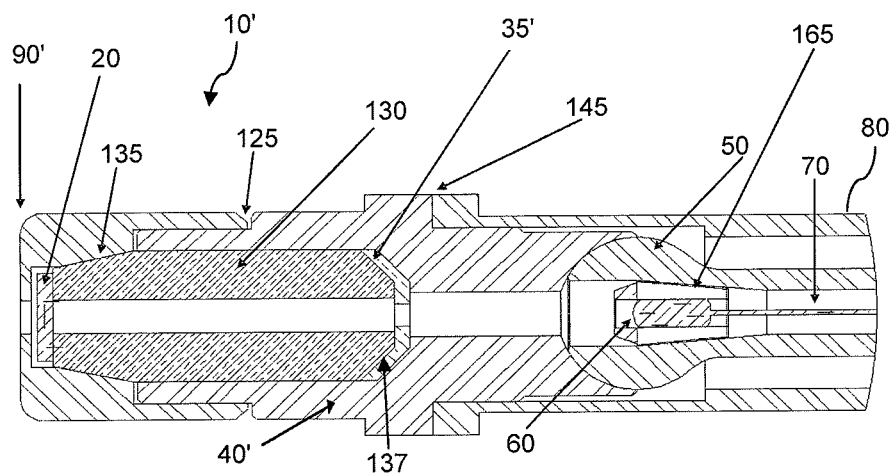
FIG. 3 shows a cross-sectional view of an optical sensor according to a third embodiment of the present invention.

FIG. 3 shows a cross-sectional view of a third embodiment of the present invention. Similar elements have been given the same reference numeral as the previous embodiments. The optical sensor 10' is similar to the optical sensor 10 of FIG. 1. Spacer tube 130 is partially tapered at each end with the angles of taper at each end being different. Spacer 135 is a hollow tube arranged so that the beam emitted from the optical fibre 70 passes through the hollow section of the tube. The end of the spacer tube 130 that the optical element 20 is attached to is tapered with taper 135. The other end of the spacer tube 130 that faces the terminal end of the optical fibre 70 is tapered with taper 137. The angle of taper 135 to the axis of spacer tube 130 is smaller than the corresponding angle for taper 137.

A machined mount 40' receives the spacer tube 130 and a dish shaped compression washer 35' separates the end of spacer tube 130 from the mount 40' reducing the stresses due to thermal expansion occurring within the spacer tube 130. As in the first embodiment the spacer tube 130 may be made from a refractory material such as sapphire or magnesium oxide, for instance. Where sapphire is used, the axis along the length of the spacer tube 130 may correspond with the C-axis of sapphire.

The spacer tube 130 is shaped so that taper 135 holds it under compression and forms an oxide seal between the aluminum oxide in the sapphire (or magnesium oxide) and the inner surface of the mount 40'. Taper 137 and a corresponding taper in the mount 40' have different cone angles to ensure alignment under compression. The angle of taper 135 is chosen as a compromise; if it were a bigger taper such as for instance, up to 45° there may be a high stress concentration at the sensor element bonding area. A smaller angle allows self locking and turns high axial loading into smaller radial loading, which is more desirable to provide continuous compression thereby reducing the maximum stress seen by the spacer tube 130. The main pressure seal is provided by the compression washer 35'. The angle of taper 137 rear angle is about 45° as a gentle taper here reduces the overall length.

The outer diameter of the spacer tube 130 provides a linear alignment guide with the inner diameter of a bore through the mount 40'. Thus the two tapers 135 and 137 may work against each other to hold the spacer tube 130 in place and more accurately aligned. The collimation length could be increased further reducing the temperature of operation of this main seal but increasing the alignment requirements.

One advantage of this design is that there is a free space path between the optical fibre 70, which may not survive the high temperatures that the sensor element 20 may withstand. A suitable distance between the terminal end of the optical fibre 70 (or its collimator) and the sensor element 20 may be around 50-100 mm. This may allow the sensor to be used in harsh environments such as within gas turbine engines where the temperature falls rapidly away from the combustion zone to temperatures of the order of 600° C., which optical fibres 70 may withstand.

A cap 90' secures the spacer tube 130 and optical element 20 assembly to the mount 40'. A sleeve weld 125 secures the cap 90' to the mount 40'.

The cap 90' also prevents any internal components of the optical sensor 10' from entering the environment to be sensed such as, for instance, a gas turbine or jet engine or for debris to enter or damage the sensor. A bore through the cap 90' allows the optical element 20 to communicate with the environment to be sensed. The inner surface of this bore may be angled by around less than 1° to the normal of the axis of the optical sensor 10' to reduce reflections from the cap being fed back into the sensor.

In this embodiment the sleeve is welded by weld 145 to the mount 40'. As with the first embodiment a ball joint alignment mechanism allows the optical fibre 70 and lens 60 assembly to be aligned with the optical cavity 200. A collet 165 secures the lens 60 within the ball 50.

The collet 165 is a split collet and the lens 60 is press fitted into the collet 165, which is itself a press fit into the ball 50. The ball 50 is preferably made of Kovar and the collet 165 of a soft metal such as copper so thermal expansion doesn't allow the lens 60 to become loose, as the initial loading allows for that. In practice this, requires careful material selection and preparation to avoid over compressing the lens 60 or it becoming loose due to stressing the collet 165 beyond its yield point. In an alternative embodiment, these problems are avoided by pressing the lens 60 into a Kovar collet at a temperature of several hundred degrees C. higher than the temperature the structure will see in use. Then when cool the collet and lens may be press fitted into the ball. The inner bore of the collet 165 may be oxidised to give a better surface for the lens 60 to bear against, and to assist retention by the formation of a chemical bond between the silica of the lens 60 and the collet oxide.

Figure 4:
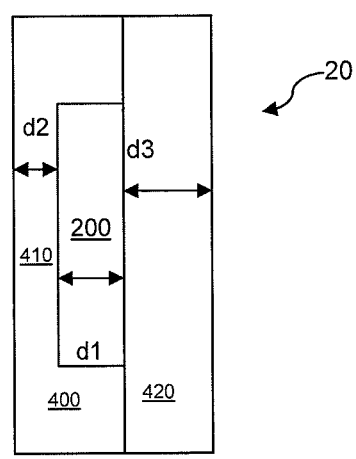
FIG. 4 shows a schematic diagram of the optical cavities of FIG. 1.

FIG. 4 shows a schematic cross-sectional view through the optical element 20. The optical element 20 comprises two parts, slab 400 and slab 420. Slab 400 is etched to form a pit 200 leaving a thin membrane 410. Slab 420 is not etched and is a uniform disc although other shapes are suitable. A chlorine-based chemistry, preferably with reactive ion etching, may be used to form the pit.

Pit 200 is defined by depth d1. The thickness of the membrane 410 is d2 and the thickness of slab 420 is d3.

Several optical cavities may be defined within sensor element 20 by the various surfaces. Each of these optical cavities may be a Fabry-Perot cavity. The pit 200 may be 1 mm in diameter and the diameter of each slab may be 4 mm. However, other dimensions may be suitable. d3 may be >200 µm, d2 may be of the order of 100 µm and d1 may be between 3 and 50 µm. When a pressure differential is applied across membrane 410 this membrane deflects thereby changing dimension d1. The faces of slab 420 provide an additional optical cavity whose dimensions change as the temperature changes due to thermal expansion. Typically, the change in dimension for a 100 μm slab of sapphire is approximately $8\times10^{-10}$ m per °C.

In an alternate embodiment both slabs may be etched to form pits, so that when the slabs are bonded together the pits may face each other to form a single cavity.

After the two slabs have been bonded together slab 400 may be polished to reduce further the thickness d2 of the membrane. Typically for pressure differences of a few bar upwards membrane thicknesses of 50-100 μm may give a deflection of 0.3 μm for a diameter of 1 mm. With these example dimensions the membrane remains substantially flat, which limits the stress in the diaphragm and therefore limits the possibility of long term creep. These dimensions also provide membrane deflections that are less than a wavelength of near infrared light typical for available telecom grade components (1300 nm or 1550 nm) in order to further simplify interrogation.

In an alternative embodiment membrane 410 has a thicker boss at the centre which does not deform as much as the remaining part of the membrane and so will remain substantially flat during the main movement. This minimises fringe fading during interrogation. A further alternative embodiment uses a membrane that is concave in the direction facing the optical fibre 70. This alternative embodiment reduces the effect of angular drift and alignment errors in the fibre-lens assembly. The radius of concave curvature may be approximately the same as the distance between lens 60 and membrane 410. Such profiling also assists with the focusing and collimation of the incident beam back to the fibre 70.

The sensor element 20 may be interrogated by illuminating it with light. Various sources of light may be used. Light sources include lasers and superluminescent laser diodes (SLD), for example. A photodetector detects the light reflected from the sensor element 20. In this way the sensor element 20, light source and photodetector may be arranged to form an interferometer. The intensity at the photodetector will vary depending on the wavelength of the light source and the lengths of the optical cavities in the sensor element 20. In other words, interference fringes caused by the optical cavities, may be detected by the photodetector. With a fixed wavelength light source, changes in the length of the optical cavities may be measured by correlating the intensity of the detected light with a particular portion (from maximum to minimum) of an interference fringe (assuming that the change in length resulted in a change due to less than one fringe). As the length in a particular optical cavity changes a sinusoidal variation in intensity will be measured at the photodetector, assuming no optical losses occur. For instance, a lookup table of intensities may be generated against cavity length in order to generate the required correlation so the measured intensity relates to one particular cavity length.

However, if a laser were used as the light source (having a coherence length greater than the largest optical cavity length) it may be difficult to differentiate between the fringes caused by each optical cavity, d1, d2 and d3. Furthermore, other parasitic cavities may exist (e.g. between the terminal end of the optical fibre 70 and the back face of the sensor element 20) that may also contribute further unwanted fringe patterns. The use of an SLD may remove various fringes from the output as the coherence length of the light produced by the SLD may be chosen to be low enough to discriminate against larger cavity lengths; light interfering within larger optical cavities will not be coherent and so will not caused fringes. For instance, if d1 is chosen to have a smaller optical cavity length than d2 and d3, and the coherence length of the SLD was less than d2 and d3, (but greater than d1) d1 will be the only optical cavity to give rise to interference fringes.

Coherence length in SLDs is typically proportional to output wavelength bandwidth. It may be difficult to obtain SLDs with sufficiently low coherence length to be able to discriminate only the smallest optical cavity length, d1, within the sensor element 20. The coherence length of the incident light may then be deliberately reduced by introducing a second SLD light source having a nominally similar wavelength (usually within about 50 nm) to the first SLD providing the required coherence length.

In an alternative embodiment two lasers, each having different wavelengths, may be used as the light source. This gives rise to two separate interference fringes for each optical cavity. Instead of using the absolute intensity value at the photodetector to find the optical cavity lengths a ratio of the signals at the two distinct wavelengths may be used. This reduces errors for instance, those due to insertion loss changes during the life of the sensor, whether due to degradation or connector variability, as the light from each laser will be subject to similar losses but the ratio should remain unaffected by these losses. The photodetector should be able to discriminate between each laser wavelength in order to measure the ratio of signals. The use of dual lasers may require the frustration of unwanted cavities, by for instance, deliberately 'wedging' optical components to avoid unwanted interference fringes from arising due to parasitic optical cavities.

In a further alternative embodiment a single laser and a SLD having a coherence length shorter than the shortest optical cavity may be used. The SLD may therefore provide a background reflection signal, which measures the return loss of the sensor independent of the sensor cavity length. This measured return loss may then be used to compensate for losses encountered by the laser light.

A further alternative interrogator may, be similar to the dual laser approach but instead use dual SLDs each providing a different central wavelength. The coherence length of, each SLD may be carefully chosen or tuned to particular optical cavities and exclude others, as described above. For instance, for either or both SLDs particular coherence lengths may be chosen, such as for instance, d1<coherence length<d3, so that the interferometer responds only, to pressure, i.e. the d1 cavity length changes as the membrane 410 is deflected. Again, a ratio of detected signals may be used for error compensation, as described above.

Similarly, as an alternative to the one laser and one SLD light source the interrogator may have two SLDs with one of the two SLDs having such a short coherence length that it will not provide interference fringes for any optical cavity present (with the other SLD suitable to generate fringes). However, this short coherence length SLD may still be sensitive to losses due to misalignment of the sensor and therefore provide an internal calibration for the detected signal intensity. In other words in this configuration the second SLD may provide a normalisation signal.

As a further alternative interrogator a single SLD with a broader bandwidth may be used with the resultant light resolved by a spectrometer and computer.

Figure 5:
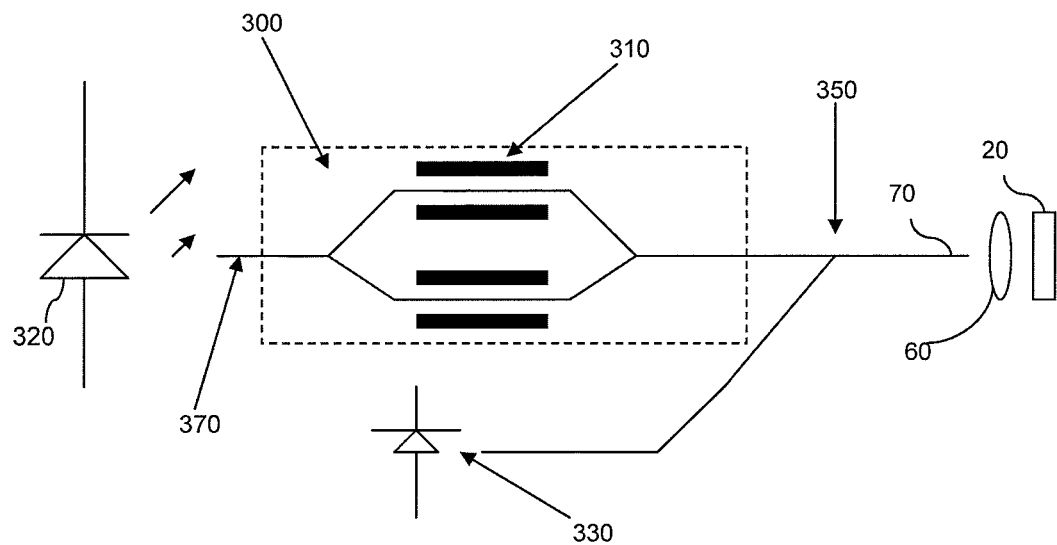
FIG. 5 shows a schematic diagram of an interferometer including a phase modulator and light source used to illuminate and detect light from the optical sensors of FIGS. 1-3.
Figure 5A:
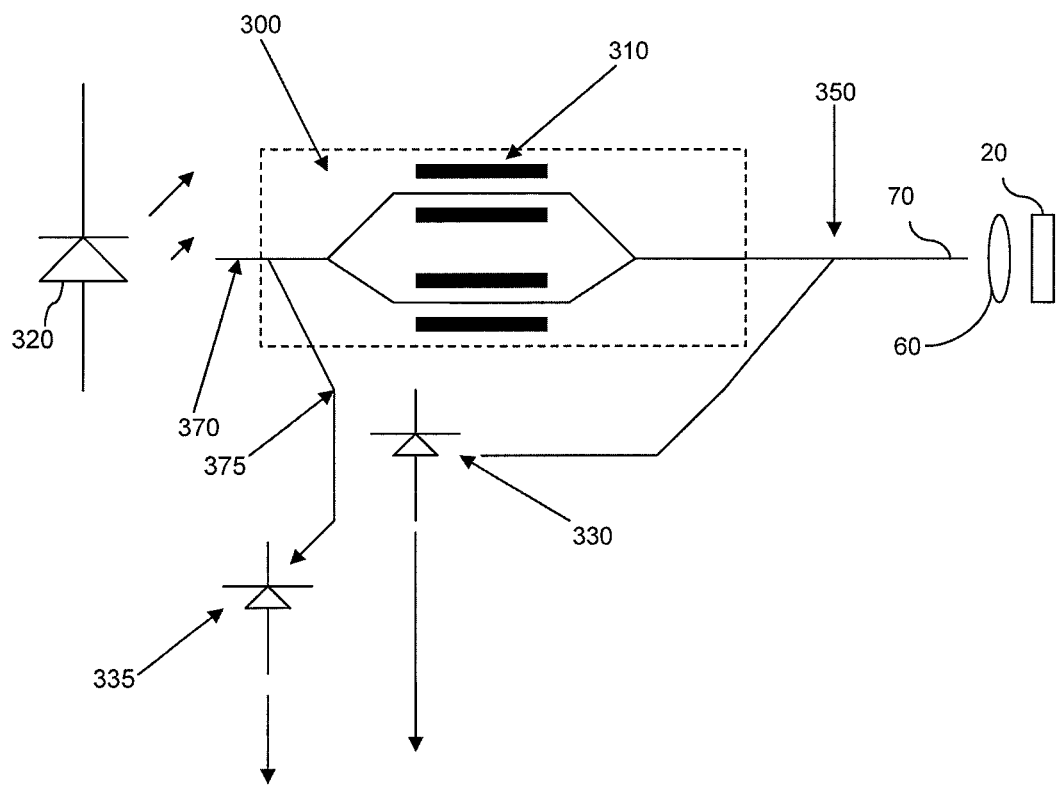
FIG. 5a shows a schematic diagram of an alternative interferometer to that shown in FIG. 5.
Figure 5B:
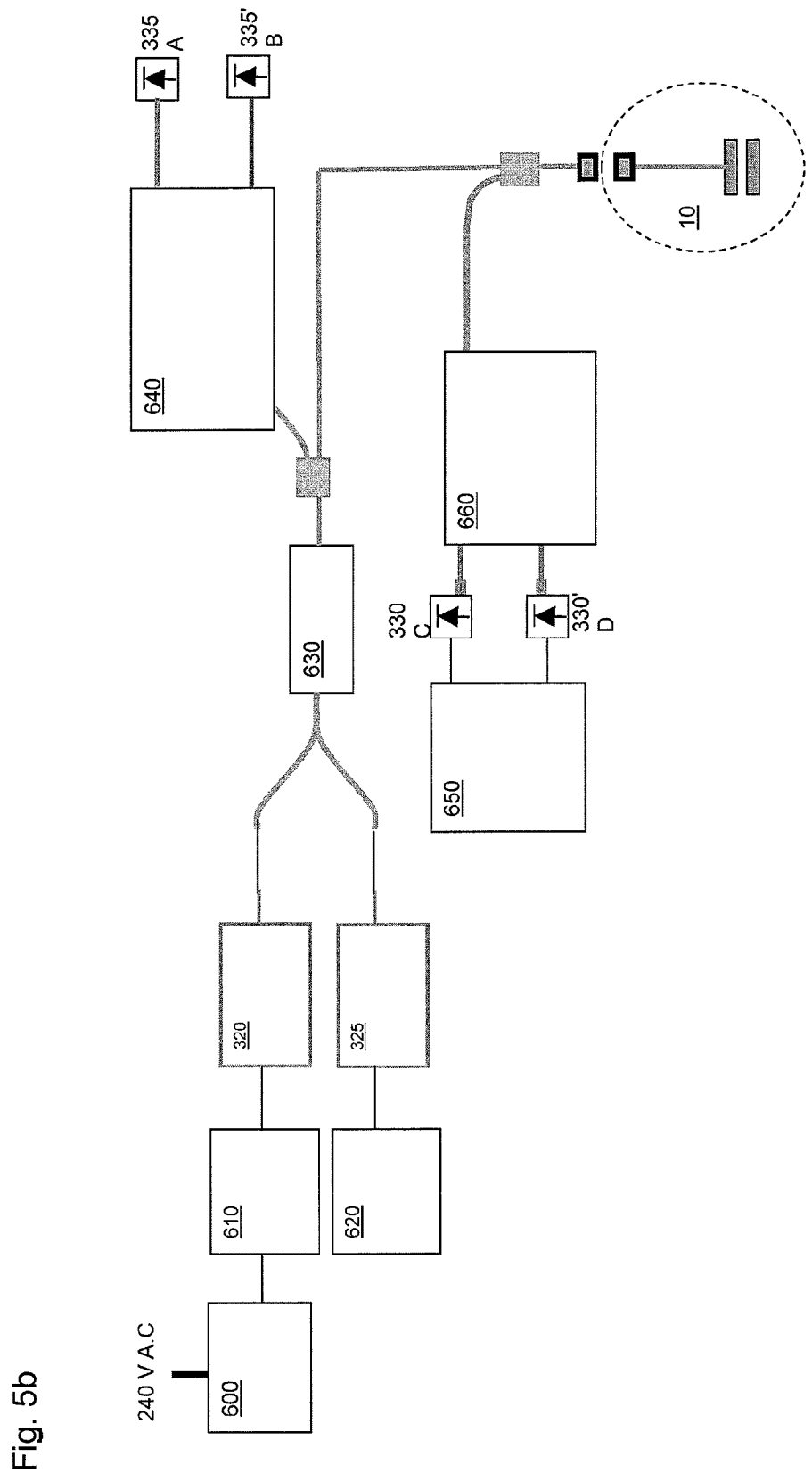
FIG. 5b shows a schematic diagram of further alternative interferometer to that shown in FIG. 5, including two light sources.
Figure 5C:
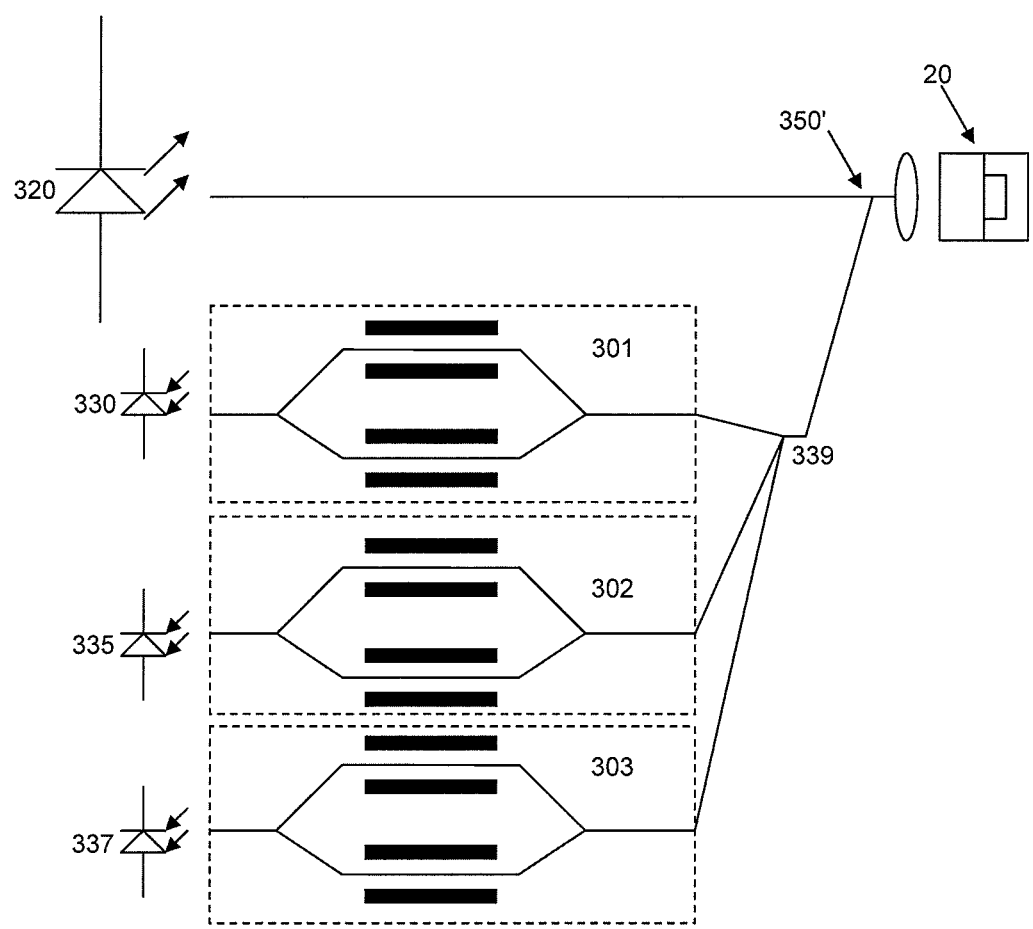
FIG. 5c shows a schematic diagram of an example multiple interferometer interrogator used to illuminate and detect light from the optical sensors of FIGS. 1-3.

FIG. 5 shows a schematic diagram of an alternative interrogation system suitable to interrogate the optical sensor 20. Various interrogation methods may be used depending on the information required from the optical sensor. Each optical cavity, d1, d2, d3, in the optical sensor may yield different information. Deflection of the membrane 410 due to pressure variations may change the length of d1, for instance. Thermal expansion may change d2 and d3 and so indicate temperature.

Any or all of these optical cavities may be interrogated. This alternative interrogator may comprise a Mach-Zehnder interferometer 300 illuminated by a SLD 320 (having a coherence length less than each optical cavity, d1, d2 or d3, to be interrogated) via a single mode fibre 370 pigtailed to the SLD. It should be noted that such an SLD would not be able to discriminate any of the optical cavities, d1, d2 or d3 used alone but relies instead on the Mach-Zehnder interferometer. However, the Mach-Zehnder interferometer effectively restores coherence in order to generate inference fringes for one or more particular optical cavities. Within the Mach-Zehnder interferometer 300 there is at least one phase modulator 310 and preferably two. Fibre 70 is coupled to the side of the Mach-Zehnder interferometer 300 opposite the SLD 320. An interrogator chip comprising the Mach-Zehnder interferometer 300 may be constructed on any suitable integrated optics platform, such as silicon on insulator, for instance.

Light, spectrally modified by the Mach-Zehnder and control electronics (not shown), adjusts the signal to correspond with the cavity length of interest in the optical sensor. The light is then fed through a 3 dB coupler 350 to the sensor head, which is shown schematically here as sensor element 20, and a collimation lens 60. Half of the return light from the 3 dB coupler 350 is channeled back to a photodiode 330 and thence to the detection electronics. Such an interrogator may be suitable for interrogating any or all of the optical cavities, d1, d2 and/or d3 to obtain pressure and/or temperature information. For instance, the expansion or elongation of more than one optical cavity may be used to reduce inaccuracies in temperature determination.

FIG. 5 a shows a schematic diagram of a further embodiment similar to the example shown in FIG. 5. However, in this further embodiment a second photodiode 335 is tapped into the single mode fibre 370 using a further coupler 375. The tap may draw off around 5% of the light (or other small proportion). Therefore, this second photodiode 335 provides a signal proportional to the emission of the SLD 320. This signal may be used to cancel out any variation in the signal obtained from the first photodiode 330 due to variations or noise in the SLD output. For instance, the signal from the first photodiode 330 may be divided by the signal from the second photodiode 370 to provide a corrected signal. This corrected signal may provide, an improvement in performance.

FIG. 5 b shows a schematic diagram of a dual SLD example implementation. A DC power supply 600 drives the system from an AC mains supply. However, power may be obtained from other sources especially when the device is used to monitor engines in vehicles (e.g. portable power sources). A first SLD 320 and a second SLD 325 are supplied with power using filtered drive circuits 610, 620. In this embodiment each SLD supplies a different centre wavelength. The light outputs from each SLD 320, 325 are combined in a beam combiner 630. A small proportion (~5%) of the combined light is tapped off from a transmitter fibre. The two wavelengths are separated using a course wavelength division multiplex (CWDM) demultiplexer (transmit demultiplexer 640) and the wavelength separated light is provided to two photodiodes 335, 335' in order to provide error correction signals A and B to cancel out any noise and/or intensity output variation generated by each SLD, respectively. The wavelength bandwidth for each SLD (or other dual or multiple light sources) may be non-overlapping.

The remaining dual wavelength signal (~95%) is directed to the sensor head 10 (via the 3 dB coupler 350), which contains the sensor element 20 and operates as described previously. Reflected light is collected by the 3 dB coupler 350 and demultiplexed in a CWDM receiver demultiplexer 660. The resultant light is therefore again separated by wavelength and sampled by receiver photodiodes 330, 330' providing receiver signals C and D corresponding to each wavelength. The received signals C, D are analysed using analysis electronics 650 or a suitably configured computer system. The analysis electronics divides the signals according to the following scheme: C/A and D/B. This division step reduces variations due to connector losses or losses in the sensor head 10, as such losses will be similar or the same for both wavelengths. This signal processing also reduces amplitude fluctuations due to each SLD. To determine where on an interference fringe the output lies, (C/A) is then divided by (D/B) to provide a corrected signal.

Figure 13:
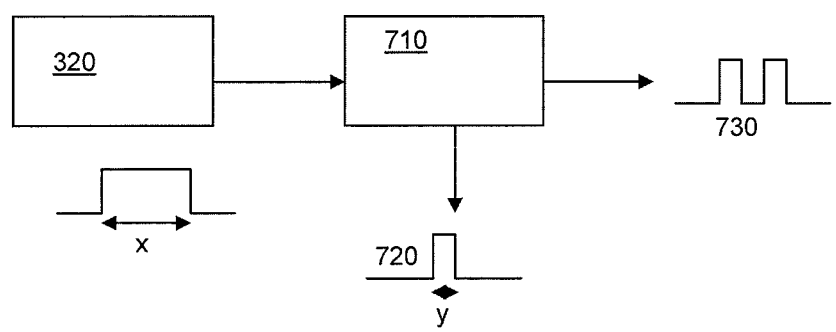
FIG. 13 shows a schematic diagram of an example optical filter arrangement used to generate the two light sources shown in FIG. 5b.

Alternatively, a single SLD may be filtered to provide two outputs or wavelengths. Such optical filtering is shown schematically in FIG. 13. For example, the wavelength bandwidth of SLD 320 may be approximately 30 nm (x). A notch filter 710 may selectively reflect a narrow wavelength band of light to form a first optical signal 720 having a bandwidth of around 13 nm (y). The remaining light may pass through the notch filter 710 to provide a second optical signal 730. The two optical signals may be used as if they originated from two sources or SLDs, as described above.

Alternatively, other optical filters may be used so provide two narrow bands. The band width for each narrow band may be around 15 nm, for instance. These narrow bands may be centered on any convenient wavelength including 1510 and 1550 nm, for instance.

Other bandwidths and wavelengths may be used as appropriate.

In an alternative embodiment the Mach-Zehnder interferometer 300 can be placed between the sensor and the detector with the same effect.

FIG. 5 c shows a schematic diagram of a three-interferometer arrangement. Each one of the three interferometers 301, 302, 303 is a Mach-Zehnder interferometer tuned or nominally matched to a different one of the three cavities d1, d2 or d3 of interest. A three-way splitter 350' divides the signal for each interferometer. Three photo diodes 330, 335, 337 are shown coupled to each of the three Mach-Zehnder interferometers 301, 302, 303. Alternatively, multiplexing may be used so that all three Mach-Zehnder interferometers 301, 302, 303 may be coupled to a single photodiode. FIG. 5 c shows each Mach-Zehnder interferometer 301, 302, 303 between the sensor element 20 and the three photodiodes 330, 335, 337. Alternatively, the Mach-Zehnder interferometers 301, 302, 303 may instead be between the light source 320 (e.g. SLD) and the sensor element 20.

More than three interferometers may be used in a similar arrangement to that shown in FIG. 5 c, especially to interrogate more than three cavities. Other arrangements of interferometers may be used, for instance, where one (or more) of a plurality of interferometers interrogates multiple cavities whilst the remaining interferometers are directed to a single cavity.

The method of cavity interrogation is described in "Phase-nulling fibre-optic gyro", Cahill and Udd, Opt. Lett. Vol. 4, pp 93.

A phase shift may be applied to the Mach-Zehnder interferometer 300 such that its spectral transmittance exactly matches the spectrum due to the sensor element's 20 reflected signal. A small dither signal (for instance, a triangle wave) may be applied to the phase shifter 310, then because of the symmetry of the transfer function locally, the resulting signal may be symmetrical, i.e. the output from the detector at the two dithering positions may be equal so that an error signal, being the difference between them, may have a magnitude of zero. However, where the Mach-Zehnder interferometer 300 is not initially at a null point then the signal at the detector generated at the two extremes of the dither signal may be equal to each other and their difference may give rise to a non-zero error signal. This error signal may be suitably processed to be used to instruct a change in the Mach-Zehnder off-set phase to minimise the error signal. The dither signal may be up to several MHz, for instance. Therefore, changes in the dimension d1 of the optical cavity 200 occurring up to several 100 kHz or about 1 MHz may be accommodated and detected. In this way, acoustic measurements can be made.

A further alternative embodiment may use white light interferometry with a two-beam interferometer as described in US 2006/0061768. A distributed sensor such as for example, a CCD may be used although this may not be particularly suitable for acoustic measurements.

The phase modulator 210 may be a PIN diode phase modulator as described in WO 99/24867, WO 99/60341 and US 2005/0157305. Such a phase modulator may have associated control electronics capable of establishing the path length required to match any or all in sequence of the cavities presented by the sensor at a speed and resolution adequate for high dynamic range acoustic measurements.

Alternatively, a number of Mach-Zehnder interferometers may receive the signal from the sensor element, but each one may be optimised for one particular cavity from the sensor, and feed to its own photodetector and associated amplifier.

Figure 6:
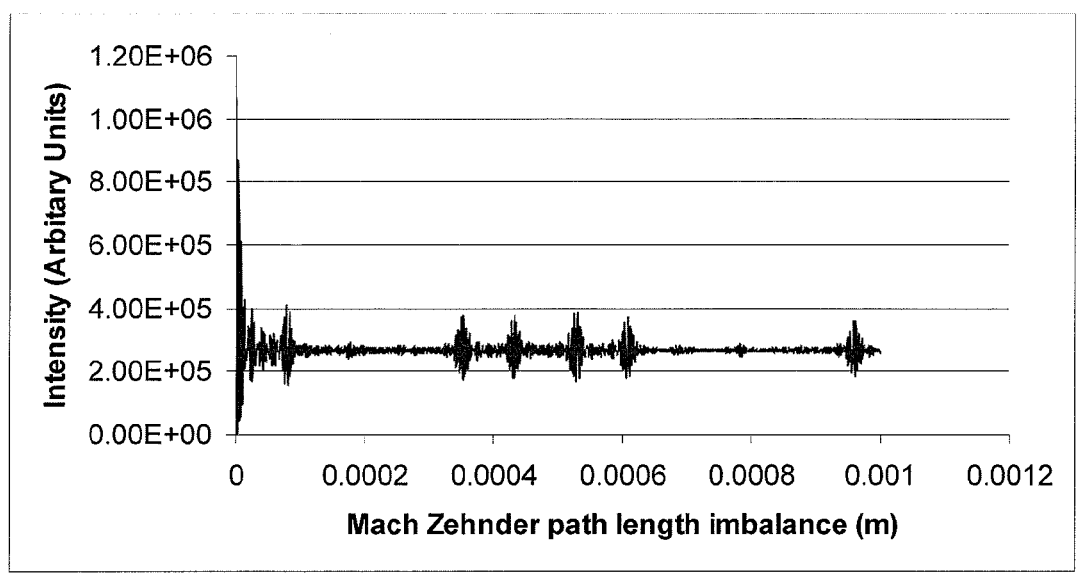
FIG. 6 shows a graph of received light intensity versus the optical path difference induced in the phase modulator of FIG. 5 for an example optical sensor according to one embodiment of the present invention.

FIG. 6 shows a graph of received light intensity versus the optical path difference induced in the phase modulator 310 for a sapphire sensor element 20 made up of a sheet of sapphire 150 μm (d3) thick with a vacuum cavity (d1) of 40 μm and final sapphire layer (which forms a membrane that responds to pressure) of 100 μm (d2).

The graph of FIG. 6 shows a minimum in response at 352 μm and 960 μm and a maximum at 432 μm. This is due to the phase change at reflection from going to higher index material to a lower index. This corresponds to the path length of the first piece of sapphire 100 μm thick (multiplied by refractive index of sapphire 1.76 and by 2 because the path is only traversed once in the Mach Zehnder but twice in the sensor). If 2 times 40 μm is added to this value one gets 432μ, and if 150μ multiplied by two and by 1.76 is added to 432μ one gets 960μ. The detection algorithm can either scan either side of these three values and therefore use one Mach-Zehnder interferometer to 'look' for three different minima, or the light returning from the sensor may be fed into three Mach-Zehnder interferometers that each look around one of the cavity lengths (d1, d2 or d3) and minimise the signal into their own photodetector. Note that in this case it would not be appropriate to have a Mach-Zehnder interferometer between the light source and the sensor element 20. If, for example a material with a significant electro optic effect was used such as lithium niobate then the phase change could be achieved using the electro optic effect.

The graph of FIG. 6 shows other signals due to parasitic cavities. However, for clarity, discussion of these parasitic cavities is omitted.

As will be appreciated by the skilled person, details of the above embodiment may be varied without departing from the scope of the present invention, as defined by the appended claims.

For example, the alignment technique may be used with an alignment mechanism other than the ball joint device described above.

Other suitable optical fibres for use as the waveguide, include photonic band gap fibres or LEAF fibres, for instance.

Lens 60 may be a GRIN lens, silica aspheric or spherical convex or other lens suitable for use at 600-700° C.

Optical surfaces not providing an optical cavity surface may be anti-reflection coated by for instance, "moth eye" or other suitable coating techniques.

The ball joint may be fixed in place after alignment by e-beam welding or other technique that avoids distorting the housing body due to the generation of excessive heat.

More than one lens may be included to collimate or focus the beam emitted from the optical fibre 70. This allows larger diameter beams that improve efficiency of illumination and collection.

Other materials may be deposited on to the membrane 410 to increase the thermal response of the sensor. For instance, SiC or Si, suitably passivated with a material such as silicon nitride, may be used. Such materials provide an amplified thermal effect which allows higher temperature sensitivity further allowing less material to be used reducing the time constant for thermal detection and monitoring.

The geometry of the sensor may be changed to allow the beam emitted from the optical fibre 70 to travel in the plane of the membrane 410. This may result in an optical path of up to several mm to be achieved for a membrane thickness d2 of a few μm. This provides a faster temperature sensor due to a reduction in the required mass.

The cavities of the optical element 20 may be interrogated with a dual laser, a laser and SLD to allow discrimination between long and short cavities or with a slave interferometer with broadband light.

The components of the optical sensor may be assembled at a suitably elevated temperature to ensure compression over the working temperature range.

In an alternative embodiment more than one fibre may be bonded to rear of the collimator lens to improve strength and durability, one optical fibre carries light and the others are for mechanical purposes.

To improve mechanical strength of the lens 60 to optical fibre 70 joint further glass encapsulation around this joint may be used.

Other thermal insulation may be used to maintain the optical fibre 70 cooler than the dielectric body, including partial or full vacuum or gas filling.

Figure 7:
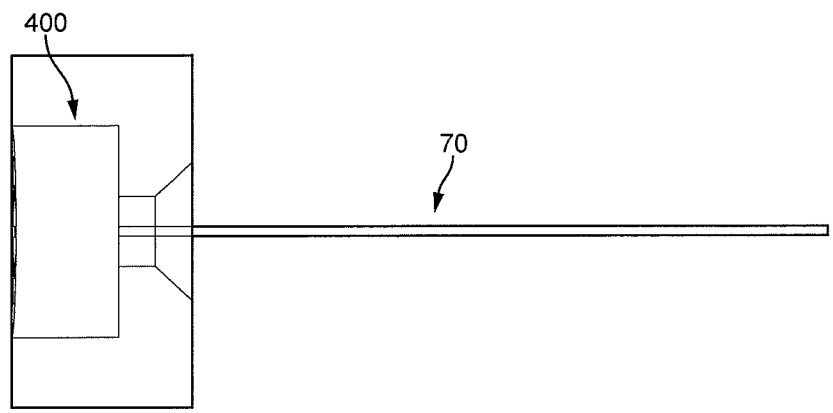
FIG. 7 shows a side view of a lens and optic fibre mount used within a fourth embodiment of the present invention.

In an alternative embodiment the alignment mechanism for the bonded optical fibre 70 and lens 60 assembly may include a cylindrical spring clip arrangement as shown in FIG. 7. A cylindrical spring clip 400 retains the lens 60 by supporting the lens 60 around the circumference of the lens 60. This reduces the effect of thermal expansion on the axial alignment of the lens 60.

Figure 8:
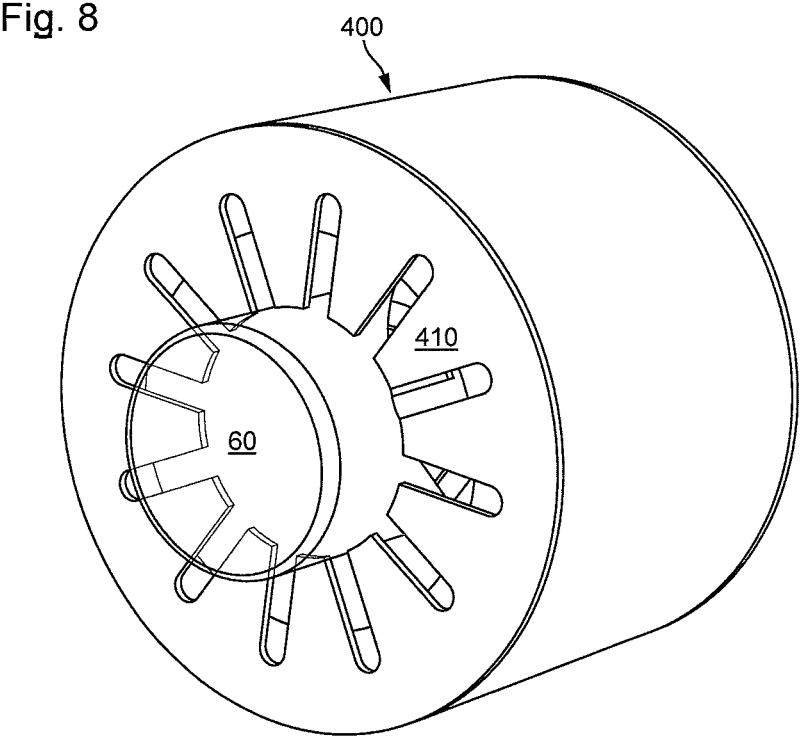
FIG. 8 shows a perspective view of the lens mount of FIG. 7.

FIG. 8 shows a perspective view of the spring clip 400 with the lens in place. A plurality of spring fingers 410 grip and apply a force to the circumference of the lens 60.

FIG. 9A shows a fibre-lens assembly according to a further embodiment of the present invention. A cylindrical substrate 510 having two parallel planar surfaces is used to form the lens 60'. A lens surface 500 is formed as a curve by etching or micro-machining one planar surface of the substrate 510 so that a curved surface is formed surrounded by a planar surface. The substrate 510 may be made from sapphire or glass, for instance. FIG. 9O shows an expanded view of the lens surface 500. The lens surface 500 may be spherical or aspheric. It may also be a positive or negative lens. In one embodiment the radius 520 of the lens surface 500 is 0.5 mm but may be smaller. The radius of curvature of the lens surface may be 0.25 mm, for instance. The dimensions depend on the required lens-optical sensor separation. The circumferential portion of the cylindrical substrate 510 provides a support surface for the lens 60' that is normal to the optical axis of the lens 60'.

The planar surface surrounding the lens surface 500 may then abut a corresponding surface in the end cap 90 or 90' or other suitable portion of the mount 40 or 40'. As the surfaces are relatively large compared with the lens surface 500 alignment of the lens may be simplified. The planar surface surrounding the lens 60 may be urged against the end cap 90 or 90' or mount 40 or 40' by the spring fingers 410 of the spring clip 400 applying an axial force on the lens 60, e.g. by the spring fingers 410 bending to some extent at the point that they meet the body of the spring clip 400. Further accuracy in alignment of the lens 60 may be achieved by the abutting surface of the cap 90 or 90' or mount 40 or 40' having a bore or chamfer corresponding to the extent of the lens surface 500 such that the lens surface 500 is received by the bore or chamfer.

A planar lens may improve the alignment of the device as it may seat more accurately within the housing (i.e. relative to the optical axis). The fibre 70 and lens arrangement may then be aligned, as described above, before being welded in place by a $CO_2$ laser, for instance. This passive alignment technique may be extended to other lens types including rod lenses, for instance.

FIG. 9B shows a cross-sectional view along line C-C of FIG. 9A. The opposite planar surface of the substrate 530 (i.e. opposite the etched surface containing the curved lens surface 500) is bonded to the optical fibre 70, as described above with reference to FIGS. 1 and 3, to the normal of the planar surface 530. Thermal fusion bonding or other suitable bonding may be used. The lens surface 500 as well as the optical fibre bonding point may be centered on each planar surface of the substrate 530 but should at least be opposite each other and collinear.

The cylindrical substrate 510 may be 3 mm in diameter 540 and 1.5 mm thick 550, for example.

Figure 10:
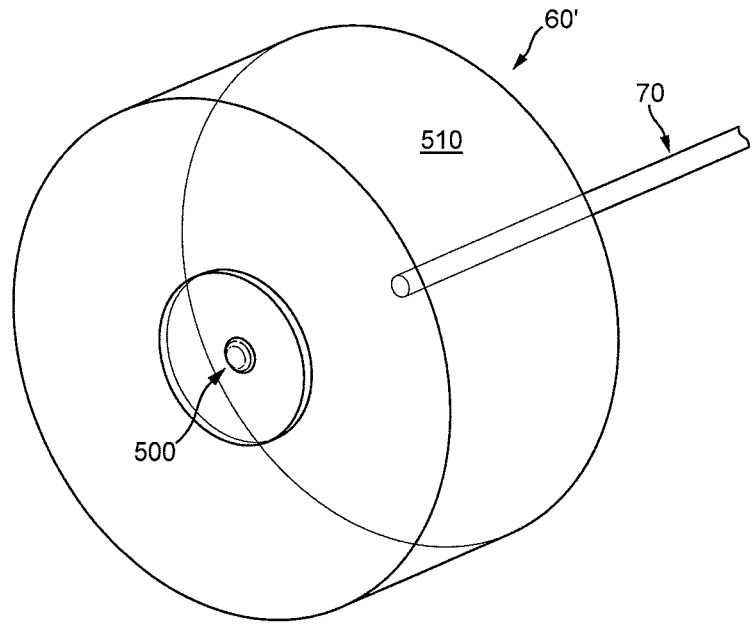
FIG. 10 shows a perspective view of a lens having a curved portion used within a sixth embodiment of the present invention.
Figure 11:
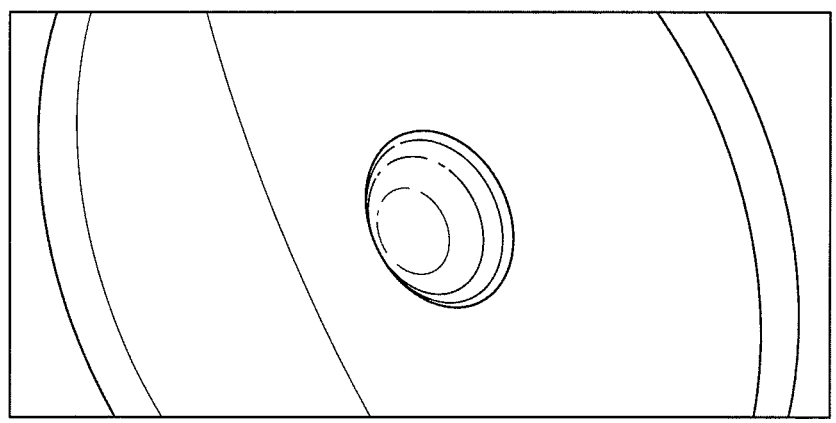
FIG. 11 shows a magnified view of the curved portion of FIG. 10.

FIG. 10 shows a perspective view of the cylindrical substrate 510 and fibre 70 of FIGS. 9A-C. FIG. 11 shows a magnified view of the lens surface 500 within the etched or micro-machined region of the substrate 510. This embodiment allows easier handling of the lens 60' during manufacture and alignment. Although a cylindrical substrate 510 is shown other profile shapes such as square, rectangular and hexagonal, for instance, may be used.

Figure 12:
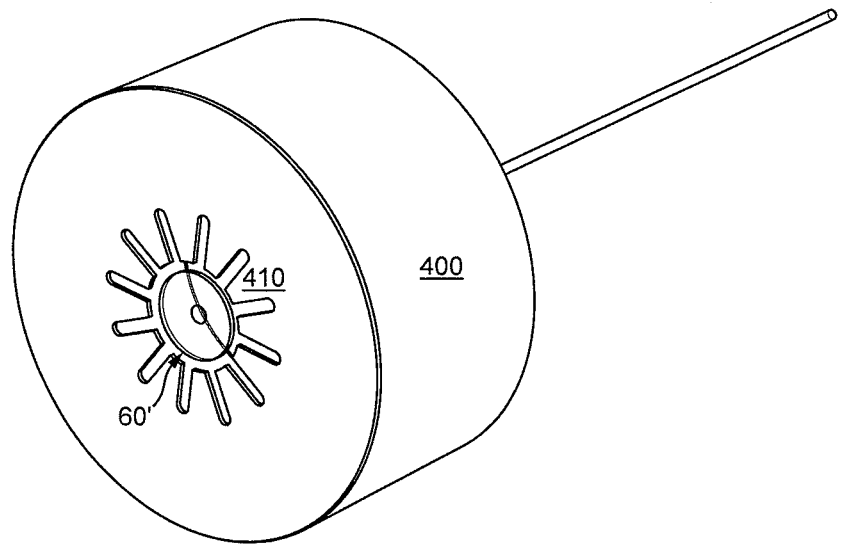
FIG. 12 shows a perspective view of a mount supporting the lens of FIGS. 9A-11.

The substrate 510 may be supported by the cylindrical spring clip 400 as described with reference to FIGS. 7 and 8 or other suitable support or alignment mechanism. FIG. 12 shows the lens 60' and fibre 70 arrangement held by a suitable spring clip 400 similar to that described with reference to FIG. 8.

Alternatively, the lens may be a fresnel lens or an array of smaller lenses (e.g. 20-50). These types of lenses may be made more easily using lithographic and/or wafer scale dry etching techniques where scales deeper than 20 μm are difficult to fabricate.

Figure 14:
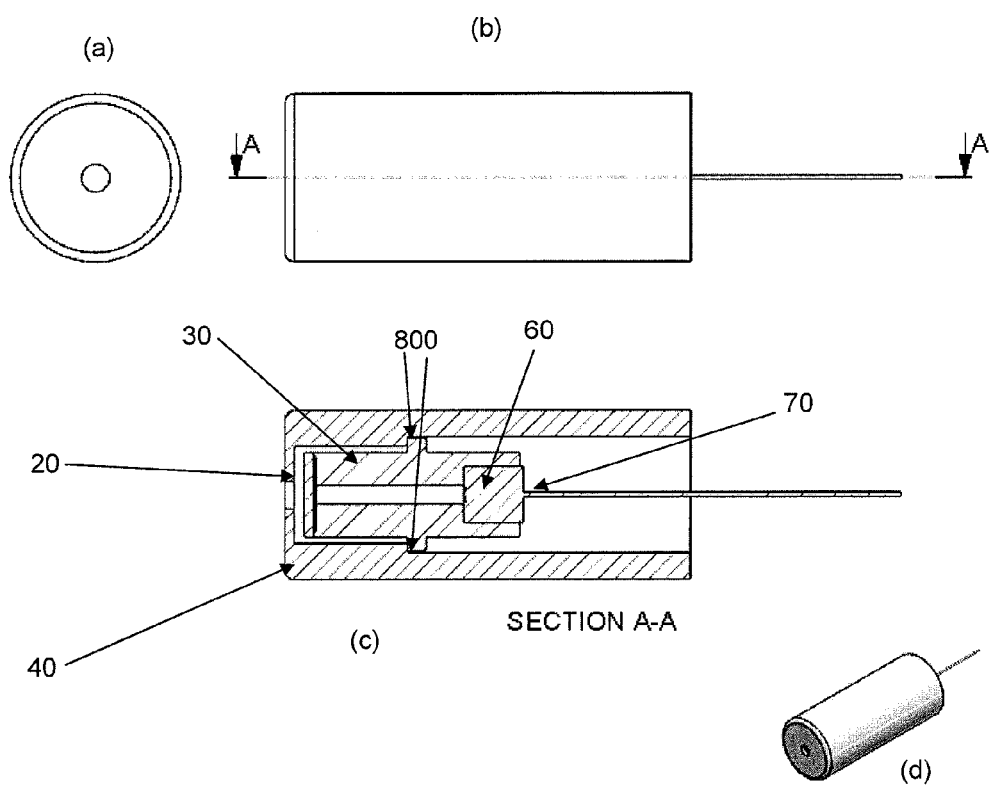
FIG. 14 *a* shows an end view of an alternative embodiment to the example optical sensor of FIG. 1.

FIGS. 14 *a-d* show four views of an optical sensor according to a further embodiment. FIG. 14 *a* is an end view, FIG. 14 *b* is a side view and FIG. 14 *c* is a cross-sectional view along the line A-A of FIG. 14 *b*. FIG. 14 *d* shows a perspective view of the optical sensor. In this embodiment an inner support tube 30 supports a sensor element 20 in a similar manner to that described with reference to FIG. 1 (although with a hollow tube rather than solid). Similarly, a lens 60 has been welded to a fibre 70 to provide a collimated beam for illuminating and collecting light from the sensor element 20.

However, in this embodiment the inner support tube or spacer 30 is itself spaced apart from the housing or case 40 to improve mechanical and/or temperature isolation. In this case, such a spacing is achieved by a spacing projection in the form of an annular projection 800 provided around the inner support tube (spacer) 30. This provides a single or isolated fixing point for forming a connection between the optical components and the outer casing or housing 40. In other words, the optical components, including the sensor element 20, lens 60 and fibre 70 may be substantially mechanically and/or thermally isolated from the outer casing 40, whilst maintaining support and environmental protection. The inner support tube or spacer 30 is substantially separated from the outer casing 40 by a gap, which may be filled with gas or other fluid or evacuated to provide additional thermal shock protection and isolation.

This embodiment improves both thermal and mechanical isolation of the optical components. The heat path from the environment external to the outer casing 40 (which may be at elevated temperatures) to these optical components is therefore limited to this single point of contact. Alternatively, the annulus 800 may be broken to limit the contact area between the optical components and the outer casing 40. In this case more than one point of contact may be made (i.e. by several lugs or shims) yet still improving thermal and mechanical isolation.

The spacer 30 does not experience significant mechanical loads but provides a thermal shunt. The annulus 800 provides asymmetrical fixing point so that any resonances may be well controlled and predicted. The resonant frequency of the optical components within the inner support tube 30 may be configured out of the range of pressure frequencies or sound that the device is designed to detect. For instance, a resonant frequency above about 9 kHz may be suitable and can be adjusted by varying the length or mass of the inner tube or spacer 30. Tapering of the inner tube 30 may also damp out certain frequencies or resonances, if necessary.

The point of contact may be set back from the sensor element 20 end of the device, i.e. away from the hot end in use. This may further limit the heat conduction to any optical elements, including the fibre/lens joint. The hot end may act as a thermal shunt to keep the inner optical assembly more tied to the back end (cooler) temperature.

This embodiment may improve resilience to distortion for instance, when the device is knocked or fixed (screwed) into place.

In this further embodiment the fibre may be actively aligned before being fixed in position, as described previously.

The invention claimed is:

1. An optical sensor comprising:
    an optical cavity defined by a dielectric body and responsive to one or more physical environmental conditions;
    a waveguide having a terminal end spaced apart from the optical cavity such that light is optically coupled from the terminal end of the waveguide to the optical cavity; and
    a collimator for collimating the light emitted from the waveguide;
    a spacer extending between the dielectric body at a proximal end of the spacer and towards the terminal end of the waveguide;
    the spacer arranged such that the distance between the terminal end of the waveguide and the optical cavity is sufficient such that, in use, the waveguide is maintained at a first temperature that would not damage the mechanical or optical properties of the waveguide, and the dielectric body is maintained at a second temperature, higher than the first temperature, that would be sufficient to damage the mechanical or optical properties of the waveguide; and an interrogator coupled to the waveguide and arranged to detect changes in the properties of the optical cavity.

2. The optical sensor of claim 1, wherein the collimator is a rod or GRIN lens.

3. The optical sensor of claim 1, wherein the collimator comprises a lens attached to the terminal end of the waveguide by an attachment.

4. The optical sensor of claim 3, wherein the attachment is a fusion bond between the terminal end of the waveguide and the lens.

5. The optical sensor of claim 3, wherein the lens comprises a first surface including a curved portion surrounded by a planar portion.

6. The optical sensor of claim 5, wherein the lens further comprises a planar second surface parallel with the planar portion of the first surface.

7. The optical sensor of claim 5, wherein the curved portion is formed by micro-machining.

8. The optical sensor of claim 5, wherein the curved portion is formed by etching.

9. The optical sensor of claim 1, wherein the spacer is selected from the group consisting of sapphire, MgO, MgAlO, alumina and zirconia.

10. The optical sensor of claim 1, wherein the spacer is bonded to a mount.

11. The optical sensor of claim 1, wherein the bonding is an oxide seal.

12. The optical sensor of claim 1, wherein the mount is formed from a material having thermal expansion properties substantially matched to that of the dielectric body.

13. An optical sensor comprising:
    an optical cavity defined by a dielectric body and responsive to one or more physical environmental conditions;
    a waveguide having a terminal end spaced apart from the optical cavity such that light is optically coupled from the terminal end of the waveguide to the optical cavity; and
    a spacer extending between the dielectric body at a proximal end of the spacer and towards the terminal end of the waveguide,
    wherein the spacer is configured so as to space the waveguide from the optical cavity at a distance sufficient such that, in use, the waveguide is maintained at a first temperature that would not damage the mechanical or optical properties of the waveguide, and the dielectric body is maintained at a second temperature, higher than the first temperature, that would be sufficient to damage the mechanical or optical properties of the waveguide.

14. The optical sensor of claim 13, wherein the spacer is selected from the group consisting of sapphire, MgO, MgAlO, alumina and zirconia.

15. The optical sensor of claim 13, wherein the spacer is bonded to a mount.

16. The optical sensor of claim 15, wherein the bonding is an oxide seal.

17. The optical sensor of claim 15, wherein the mount is formed from a material having thermal expansion properties substantially matched to that of the dielectric body.

18. The optical sensor according to claim 13, wherein the optical cavity in the dielectric body is defined at one end by a membrane deflectable in response to changes in external pressure.

19. An optical sensor comprising:
    an optical cavity defined by a dielectric body and responsive to one or more physical environmental conditions;
    a waveguide having a terminal end spaced apart from the optical cavity such that light is optically coupled from the terminal end of the waveguide to the optical cavity,
    a spacer extending between the dielectric body at a proximal end of the spacer and towards the terminal end of the waveguide;
    the spacer arranged such that the distance between the terminal end of the waveguide and the optical cavity is sufficient such that, in use, the waveguide is maintained at a first temperature tat would not damage the mechanical or optical properties of the waveguide, and the dielectric body is maintained at a second temperature, higher than the first temperature, that would be sufficient to damage the mechanical or optical properties of the waveguide; and
    wherein the optical cavity in the dielectric body is defined at one end by a membrane deflectable in response to changes in external pressure.

* * * * *